(12) United States Patent
Ishikawa et al.

(10) Patent No.: US 9,086,588 B2
(45) Date of Patent: Jul. 21, 2015

(54) LIQUID CRYSTAL DISPLAY DEVICE AND METHOD OF MANUFACTURING THE SAME

(71) Applicant: Japan Display Inc., Tokyo (JP)

(72) Inventors: Tomokazu Ishikawa, Tokyo (JP); Takanori Nakayama, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 14/040,917

(22) Filed: Sep. 30, 2013

(65) Prior Publication Data

US 2014/0092334 A1    Apr. 3, 2014

(30) Foreign Application Priority Data

Oct. 1, 2012 (JP) .................................. 2012-219422

(51) Int. Cl.
| | |
|---|---|
| *G02F 1/1368* | (2006.01) |
| *G02F 1/1335* | (2006.01) |
| G02F 1/1333 | (2006.01) |
| G02F 1/1345 | (2006.01) |

(52) U.S. Cl.
CPC ...... *G02F 1/133512* (2013.01); *G02F 1/13452* (2013.01); *G02F 1/133351* (2013.01)

(58) Field of Classification Search
CPC .................... G02F 1/133351; G02F 1/133512; G02F 1/13452

USPC ............... 349/42, 110, 111, 149, 187; 445/25
See application file for complete search history.

(56) References Cited

U.S. PATENT DOCUMENTS

| | | | |
|---|---|---|---|
| 2001/0028425 A1 | 10/2001 | Takasaki et al. | |
| 2003/0095225 A1* | 5/2003 | Hsu et al. ...................... | 349/149 |
| 2006/0012735 A1* | 1/2006 | Yamada et al. ............... | 349/110 |
| 2012/0257132 A1* | 10/2012 | Kitajima et al. ................ | 349/42 |
| 2014/0028961 A1* | 1/2014 | Yanagisawa .................. | 349/106 |

FOREIGN PATENT DOCUMENTS

| | | |
|---|---|---|
| JP | 2007-140561 | 6/2007 |
| JP | 2008-257014 | 10/2008 |
| JP | 2011-170134 | 9/2011 |

* cited by examiner

*Primary Examiner* — Dung Nguyen
*Assistant Examiner* — Tai Duong
(74) *Attorney, Agent, or Firm* — Lowe Hauptman & Ham, LLP

(57) ABSTRACT

A shielding metal of an adjacent liquid crystal panel separated from a mother substrate remains at an outer end part of a terminal portion of a liquid crystal display panel. The shielding metal has a two-layered structure including first shielding metals arranged at predetermined pitches and second shielding metals arranged at predetermined pitches. An insulating layer is provided between the first and the second shielding metals. This makes it possible to prevent short-circuit in wirings on a flexible wiring substrate even if the wirings on the flexible wiring substrate are brought into contact with the first or the second shielding metal.

12 Claims, 8 Drawing Sheets

RELATED ART

RELATED ART

RELATED ART

LIQUID CRYSTAL DISPLAY DEVICE AND METHOD OF MANUFACTURING THE SAME

CLAIM OF PRIORITY

The present application claims priority from Japanese Patent Application JP 2012-219422 filed on Oct. 1, 2012, the content of which is hereby incorporated by reference into this application.

BACKGROUND

The present invention relates to a display device, and in particular, relates to a liquid crystal display device that hardly causes light leakage at an area around a screen, and has a terminal portion with improved reliability.

The liquid crystal display device includes a TFT substrate having pixels with pixel electrodes and thin film transistors (TFT) arranged in a matrix, and a counter substrate that faces the TFT substrate and has color filters at the positions corresponding to the pixel electrodes of the TFT substrate, while interposing a liquid crystal between the TFT substrate and the counter substrate. An image is generated by controlling transmittance of light through liquid crystal molecules for each pixel.

The liquid crystal display device with a flat light-weighted structure has been widely used in various fields. Mobile phones and DSCs (Digital Still Camera) have employed compact liquid crystal display devices. The liquid crystal display panel is configured to bond the TFT substrate and the counter substrate by a sealing material applied to the peripheral area. An ultraviolet curing resin may be employed as the sealing material. However, since the light shielding film is applied to the peripheral area for higher contrast, the ultraviolet ray is unlikely to reach the sealing material. JP-A-2007-140561 discloses the structure that the light shielding film is formed on the TFT substrate and the counter substrate alternately, and is irradiated with the ultraviolet ray from both sides of the TFT substrate and the counter substrate so that the sealing material is cured. The light shielding film that is alternately formed on the side of the TFT substrate and the counter substrate of the aforementioned structure ensures shielding against light emitted from the backlight.

Formation of the black matrix extending to the end part of the counter substrate is effective for prevention of light leakage from the backlight around the liquid crystal display panel. If the black matrix is formed to extend to the end part of the counter substrate, it is difficult to visually confirm an alignment mark from the counter substrate, which is referred to align the TFT substrate with the counter substrate. JP-A-2011-170134 discloses the structure that the frame-like part with no black matrix is provided, from which visual confirmation of the alignment mark is allowed.

The liquid crystal display panel has an injection hole formed by opening a part of the sealing material formed around the panel, through which the liquid crystal is injected so as to bond the TFT substrate and the counter substrate. JP-A-2008-257014 discloses the structure that the alignment mark is formed around the injection hole for preventing the light leakage from the injection hole so as to ensure both light shielding effect and work for alignment of the TFT substrate with the counter substrate.

FIG. 6 is a cross sectional view showing a mechanism of the generally employed liquid crystal display device, having the light leakage from the backlight around the peripheral area of the screen to deteriorate contrast around the screen. Referring to FIG. 6, a TFT substrate 100 and a counter substrate 200 are bonded by a sealing material 50, while having an inner space defined by those substrates filled with a liquid crystal 300. A black matrix 202 is formed on the counter substrate 200, but is not extended to an end part of the counter substrate 200 so as to prevent such problem as peel-off of the black matrix 202. The light from the backlight is partially emitted from peripheral areas of the TFT substrate 100 and the counter substrate 200 toward the screen while repeating total reflection on the TFT substrate 100.

The liquid crystal display panel is stored in a frame 400 with a flange 401. The light ray incident on the counter substrate 200 at a certain angle is emitted toward the screen to deteriorate the contrast. In order to prevent such deterioration, it is preferable to form the black matrix 202 to extend to the end part of the counter substrate 200. However, the liquid crystal display panel is obtained by dividing a mother substrate into a large number of liquid crystal display panels through scribing. The end part of the liquid crystal display panel is exposed to mechanical stress. As a result, the black matrix 202 formed to extend to the end part may cause a risk that is likely to cause the peel-off of the black matrix 202 at the end part of the counter substrate 200.

If the black matrix 202 is peeled off at the end part of the counter substrate 200, water may infiltrate the end part, and intrude to the inside of a sealed portion of the liquid crystal display panel along the boundary surface between the black matrix 202 and the counter substrate 200, deteriorating reliability of the liquid crystal display device.

In order to prevent the deterioration, the black matrix 202 is not formed to extend to the end part of the counter substrate 200. Instead, a light shielding metal 20 is formed on the TFT substrate 100 to extend to the end part thereof, resulting in the model that exhibits the light shielding effect with respect to the backlight around the liquid crystal display panel. FIG. 7 illustrates a mother substrate 500 that includes four liquid crystal display panels each configured as described above. Actually, the mother substrate 500 includes far more liquid crystal display panels than four. FIG. 7 shows only four liquid crystal display panels for clear understanding.

Referring to FIG. 7, the mother substrate 500 is divided into the respective liquid crystal display panels along cutting-plane lines 40. The black matrix 202 is formed on an area around a display region 10 of the counter substrate of each liquid crystal display panel to reach the area adjacent to the end part. The light shielding metal 20 is formed on the TFT substrate to extend to the end part thereof. In other words, the light shielding metal 20 is separated along the cutting-plane lines 40.

The cutting-plane line 40 may vary with a predetermined tolerance for separation of the liquid crystal display panels from the mother substrate 500. For this, the light shielding metal 20 is formed to run over the area of the liquid crystal display panel C so as to make sure that the light shielding metal 20 is formed to extend to the end part of the liquid crystal display panel D.

FIG. 8 is a plan view illustrating that a part of the light shielding metal 20 of the liquid crystal display panel D remains at the end part of a terminal portion of the liquid crystal display panel C after its separation from the liquid crystal display panel D. Referring to FIG. 8, the TFT substrate 100 is formed to be larger than the counter substrate 200. An extended part of the TFT substrate 100 serves as a terminal portion 150 to which a not shown flexible wiring substrate is connected. As FIG. 8 shows, the black matrix 202 is formed to extend to the peripheral area of the counter substrate 200, and the light shielding metal 20 is formed to extend to the end part of the TFT substrate 100 except the terminal portion 150.

The shielding metal 20 linearly formed on the liquid crystal display panel D as shown in FIG. 7 remains at the outer end part of the terminal portion 150 shown in FIG. 8. The light shielding metal 20 may cause the risk of short circuit in a wiring on the flexible wiring substrate upon its connection to the terminal portion 150 as described below.

FIG. 9 is a sectional view taken along line A-A of FIG. 8. Referring to FIG. 9, the TFT substrate 100 and the counter substrate 200 are bonded by a sealing material 50. A liquid crystal 300 is sealed inside the sealing material 50. The black matrix 202 is formed on the inner side surface of the counter substrate 200, which exceeds from the sealing material 50 to the area around the end part. The light shielding metal 20 is formed at the side of the TFT substrate 100 to its end part under an inorganic passivation film 106. This makes it possible to prevent leakage of light rays from the backlight at the end part of the liquid crystal display panel.

FIG. 10 is a sectional view taken along line B-B of FIG. 8. Referring to FIG. 10, the TFT substrate 100 and the counter substrate 200 are bonded by the sealing material 50. The black matrix 202 is formed on the inner side surface of the counter substrate 200 to the area around the end part. The TFT substrate 100 is formed to be larger than the counter substrate 200. The extended part of the TFT substrate 100 serves as the terminal portion 150, an end part of which is connected to the not-shown flexible wiring substrate.

Referring to FIG. 10, the light shielding metal 20 of the adjacent liquid crystal display panel of the mother substrate remains at the end part of the terminal portion 150. In this way, the remaining light shielding metal 20 may cause the risk of short-circuit in the wiring on the flexible wiring substrate upon its connection.

FIG. 11 is a perspective view of a part around the terminal portion 150 of the liquid crystal display panel for explanation about the aforementioned problem. Referring to FIG. 11, a flexible wiring substrate 30 is connected to the terminal portion 150 of the TFT substrate 100. A wiring 31 is formed on the flexible wiring substrate 30. The wiring 31 is mostly coated with an insulating resin while the wiring 31 around the terminal of the flexible wiring substrate 30 is in a bare state.

This may cause the risk of short-circuit in the wirings 31 on the flexible wiring substrate 30 owing to the light shielding metal 20 that remains at the end part of the TFT substrate 100. Since the flexible wiring substrate exhibits flexibility, there may be the case where the light shielding metal 20 is brought into contact with the wiring 31 on the flexible wiring substrate 30 at points of C and D shown in FIG. 11, for example, resulting from bending of the substrate at the position near the terminal portion 150. This may cause short-circuit in the wirings 31.

SUMMARY OF THE INVENTION

The present invention is configured to prevent short-circuit in the wiring 31 on the flexible wiring substrate 30 connected to the terminal portion 150 owing to the light shielding metal 20 that remains at the end part of the terminal portion 150.

The present invention provides a liquid crystal display device including a TFT substrate with pixels each having a TFT and a pixel electrode arranged in a matrix, and a counter substrate having a color filter and a black matrix. The TFT substrate and the counter substrate are bonded by a sealing material, a liquid crystal is provided in an inner space defined by the TFT substrate and the counter substrate, and a part of the TFT substrate extends from the counter substrate serving as a terminal portion. A part of the TFT substrate except the terminal portion has a first light shielding metal formed to extend to an end part of the TFT substrate. The first light shielding metals each with a first width are arranged at an outermost end side of the terminal portion at predetermined pitches. Second light shielding metals each with a second width are arranged below the first light shielding metals at predetermined pitches at the outermost end side of the terminal portion via an insulating film. The first light shielding metal and the second light shielding metal are partially overlapped in a planar view.

The present invention further provides a method of manufacturing a liquid crystal display device for forming a plurality of liquid crystal display panels each provided with a TFT substrate with pixels each having a TFT and a pixel electrode arranged in a matrix, and a counter substrate having a color filter and a black matrix, which are bonded via a sealing material on a mother substrate, and separating the liquid crystal display panels from the mother substrate along cutting-plane lines. The TFT substrate at a boundary between a first liquid crystal display panel and a second liquid crystal display panel on the mother substrate has first light shielding metals each with a first width formed at predetermined pitches along the boundary, and second light shielding metals each with a second width formed below the first light shielding metals via an insulating layer at the predetermined pitches. The first liquid crystal display panel and the second liquid crystal display panel are separated at a region where the first and the second shielding metals are formed.

The present invention allows the light shielding metal to be formed to extend to the end part of the TFT substrate. This makes it possible to prevent leakage of light from the backlight at the end part of the liquid crystal display panel, and short-circuit in the wiring on the flexible wiring substrate owing to the light shielding metal that remains at the end part of the terminal portion even if the flexible wiring substrate is connected to the terminal portion. The present invention is capable of providing the liquid crystal display device that ensures high connection reliability as well as good contrast to the peripheral area of the screen.

DESCRIPTION OF THE PREFERRED EMBODIMENT

Generally, the liquid crystal display device has such types as IPS (In Plane Switching), TN, VA and the like. The present invention may be applied to the liquid crystal display device of any of those types. The present invention forms the metallic light shielding film on the TFT substrate to extend to the end part of the substrate so as to prevent leakage of light from the end part of the liquid crystal display panel. An explanation will be made with respect to the cross section structure of the liquid crystal display panel relative to an arrangement of the light shielding metal. The liquid crystal display device has various types, and it is difficult to explain about all those types. Accordingly, the cross section structure of the IPS-LITE type will be explained as a representative example.

Figure 1:
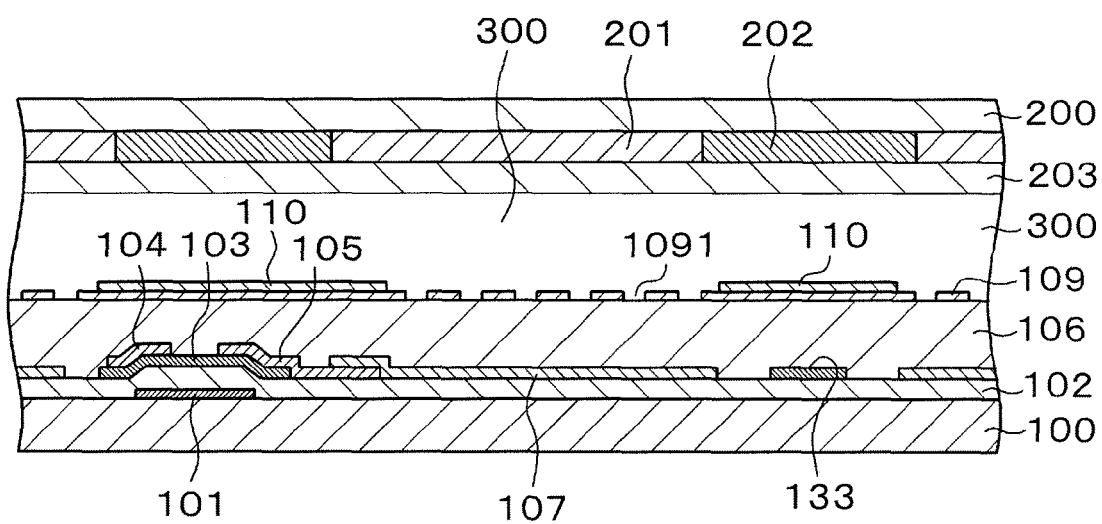
FIG. 1 illustrates a cross section structure of an IPS-LITE.

FIG. 1 is a sectional view of the liquid crystal display device of so-called IPS-LITE, that is, common top type. Referring to FIG. 1, a gate electrode 101 is formed on the TFT substrate 100 made of a glass, which is covered by a gate insulating film 102. The gate electrode 101 may be made of Al alloy, MoW alloy, MoCr alloy, or a film formed by laminating those alloys. The layer to be formed simultaneously with the gate electrode will be referred to as a gate layer.

A semiconductor layer 103 is formed above the gate electrode 101, having the gate insulating film 102 interposed therebetween. A drain electrode 104 and a source electrode 105 are formed on the semiconductor layer 103 while facing with each other, and interposing a channel region. The drain electrode 104 is connected to a video signal line (drain line) 133 at a not shown location. The drain electrode 104 and the source electrode 105 may be made of the Al alloy, MoW alloy, MoCr alloy, or a film formed by laminating those alloys. The layer to be formed simultaneously with the drain electrode 104 or the source electrode 105 will be referred to as an SD layer.

As FIG. 1 shows, a flat solid pixel electrode 107 is formed using ITO without intervening the insulating film after formation of the drain electrode 104 and the source electrode 105. The video signal line 133 that is formed simultaneously with the SD layer exists between the pixel electrodes.

An inorganic passivation film 106 made of SiN is applied onto the pixel electrode 107. A common electrode 109 having slits 1091 corresponding to the pixel is formed on the inorganic passivation film 106, and is applied over a whole surface of the screen. There may be the case that a common metal 110 is formed on a part of the common electrode 109, which blocks the light transmission in order to make the voltage of the common electrode 109 constant. The common metal 110 is made of the Al alloy, MoW alloy, MoCr alloy, or a film formed by laminating those alloys. The common metal 110 may be used as the light shielding metal. An orientation film to be formed on the common electrode or the common metal is omitted in FIG. 1.

Referring to FIG. 1, the counter substrate 200 is provided while intervening a liquid crystal layer 300. A black matrix 202 and a color filter 201 are formed on the counter substrate 200, which are covered by an overcoat film 203. The orientation film formed on the overcoat film 203 is omitted in FIG. 1. When voltage is applied to the pixel electrode 107 on the TFT substrate 100 shown in FIG. 1, a line of electric force is generated between the common electrode 109 and the pixel electrode 107 through the slits 1091. Liquid crystal molecules 301 are then rotated to control the transmittance of the liquid crystal 300 for each pixel so as to generate the image. The present invention will be described in detail in reference to the example.

FIRST EXAMPLE

Figure 2:
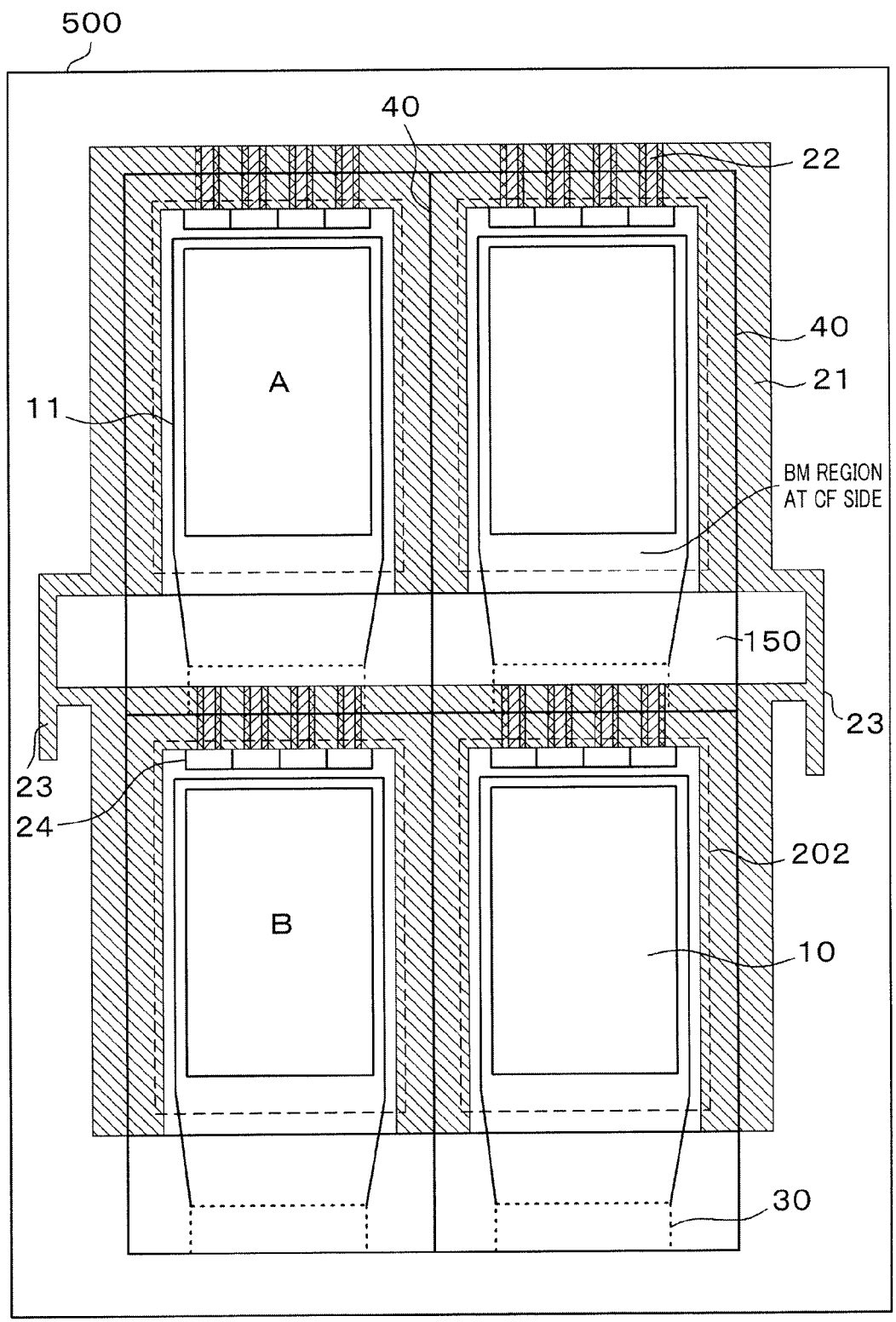
FIG. 2 illustrates a mother substrate on which liquid crystal display panels according to the present invention are formed.

FIG. 2 is a plan view of a mother substrate 500 including four liquid crystal display panels according to the present invention, which are arranged thereon. Generally, the mother substrate 500 has far more liquid crystal display panels than four. In this case, however, only four liquid crystal display panels are arranged on the mother substrate for simplifying the view.

FIG. 2 illustrates the mother substrate 500 including a mother TFT substrate and a mother counter substrate which are overlapped. Referring to FIG. 2, the mother substrate 500 is divided into four liquid crystal display panels along the cutting-plane lines 40. A first light shielding metal 21 is formed to surround a display region 10 on three sides, extending to the outside of the cutting-plane line 40 in order to ensure shielding against light from the backlight by the first light shielding metal 21 formed to extend to the end part of the TFT substrate 100.

Figure 11:
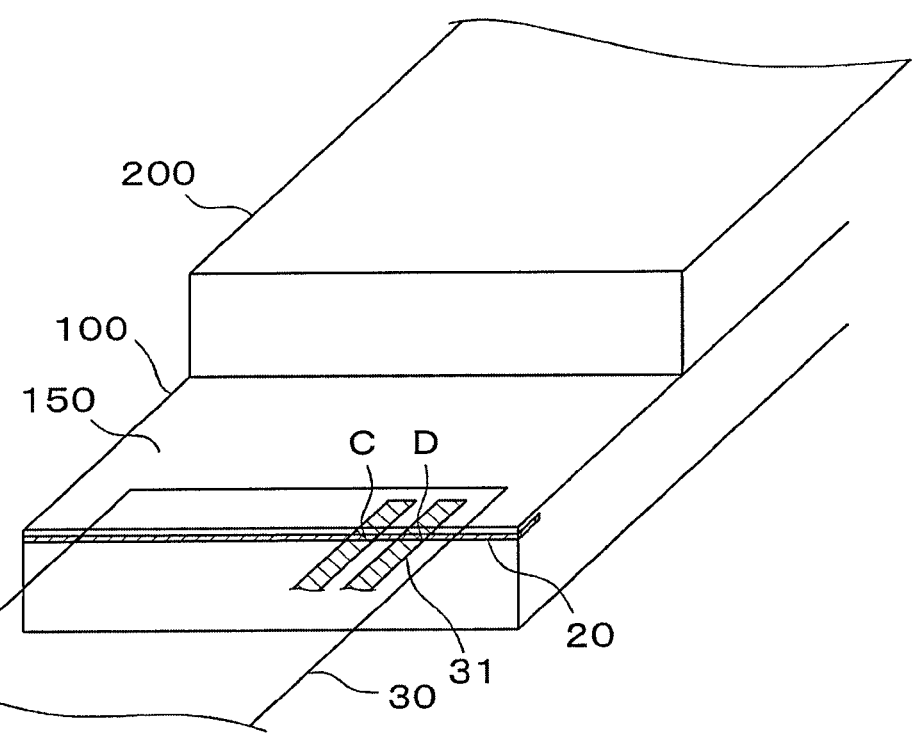
FIG. 11 is a perspective view showing that the flexible wiring substrate is connected to the generally employed liquid crystal display panel.

Referring to FIG. 2, the first light shielding metal 21 and a second light shielding metal 22 are formed to extend to the end part of the terminal portion 150 of the liquid crystal display panel A over the boundary between the liquid crystal display panels A and B so as to ensure that the light shielding metals 21 and 22 are formed on the end part of the short side of the liquid crystal display panel B. In such a case, if the light shielding metal is formed in a single layer, the problem may occur as illustrated in FIG. 11 representing the generally employed structure. That is, the light shielding metal may cause short-circuit in a wiring 31 on the flexible wiring substrate 30.

As FIG. 2 shows, the present invention is configured that the light shielding metal 20 positioned at the side adjacent to the terminal portion 150 of another liquid crystal display panel is formed as a double-layered structure including the light shielding metals 21 and 22 which are insulated to prevent short-circuit in the flexible wiring substrate 30. Referring to FIG. 2, at the boundary between the liquid crystal display panels A and B, the liquid crystal display panel B has the light shielding metals 21 and 22 extending to a part of the liquid crystal display panel A at the side of the terminal portion in order to make sure that those light shielding metals 21 and 22 are formed to extend to the end part of the liquid crystal display panel B.

The light shielding metal formed on the terminal portion 150 of the liquid crystal display panel A has a double-layered structure including the first light shielding metal 21 and the second light shielding metal 22 which are insulated, rather than the single layer. The first light shielding metal 21 may be formed as the SD layer, and the second light shielding metal 22 may be formed as the gate layer, for example. The SD layer and the gate layer are insulated by the gate insulating film 102. The aforementioned structure is capable of preventing short-circuit in the wiring 31 on the flexible wiring substrate 30 even if the wiring 31 is brought into contact with the SD layer and the gate layer individually.

Referring to FIG. 2, the first light shielding metal 21 for each liquid crystal display panel mostly performs shielding. The first light shielding metals 21 of the respective liquid crystal display panels are interconnected, and further connected to a ground wire 23. The first light shielding metal 21 separated at the short side of the liquid crystal display panel is connected via a connecting wire 24 for preventing destruction of the insulating film caused by charging of the first light shielding metal 21 during rubbing of the TFT substrate in the process of manufacturing the liquid crystal display panel.

The first light shielding metals 21 of the liquid crystal display panels before separation from the mother substrate 500 are interconnected and grounded. After they are separated, the first light shielding metals 21 are brought into a floated state. Meanwhile, the second light shielding metal 22 smaller than the first light shielding metal is in the floated state before separation of the liquid crystal display panel from the mother substrate 500. The first light shielding metal 21 and the second light shielding metal 22 are overlapped with a predetermined width in order to ensure shielding against the diagonally emitted light.

An outermost wiring 11 which surrounds the display region 10 on three sides as shown in FIG. 2 is generally a common wiring. Dotted lines on the terminal portion 150 of the liquid crystal display panels of FIG. 2 indicate the respective positions of the flexible wiring substrates 30. The broken line that surrounds the display region 10 shown in FIG. 2 indicates the end part of the black matrix 202 on the counter substrate. As FIG. 2 shows, the black matrix is not formed outside the broken line. The light shielding metals 21 and 22 on the TFT substrate serve to shield the region where no black matrix is formed.

Figure 3:
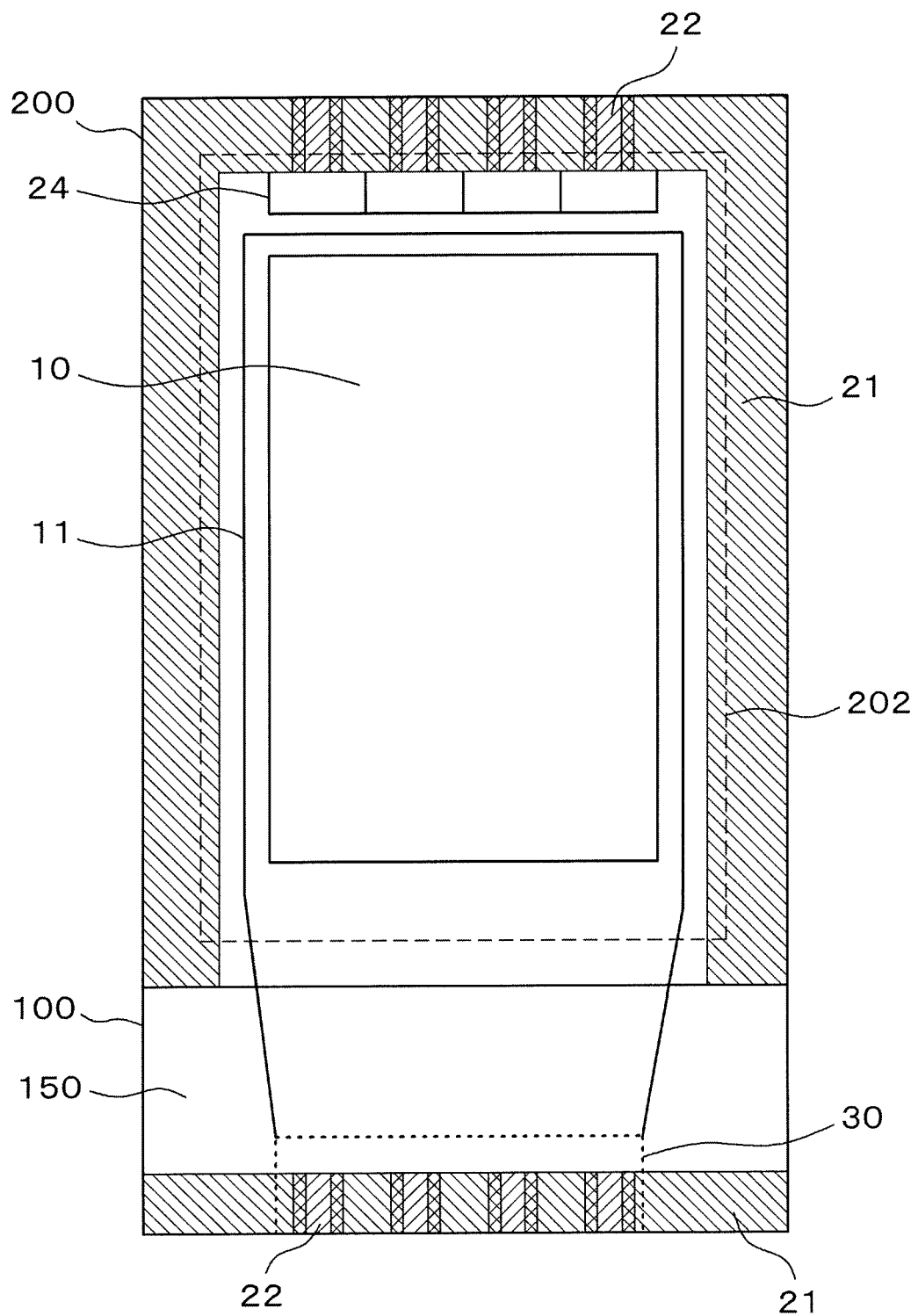
FIG. 3 is a plan view of the liquid crystal display panel according to the present invention.

FIG. 3 is a plan view illustrating the single liquid crystal display panel separated from the mother substrate shown in FIG. 2. Referring to FIG. 3, the display region 10 is formed on a part where the TFT substrate 100 and the counter substrate 200 are overlapped. The outermost wiring 11 as the common wiring is formed to surround the display region 10. The broken line that surrounds the area outside the display region 10 and the outermost wiring 11 represents the end part of the black matrix 202. In other words, the black matrix 202 is formed inside the broken line. The area outside the black matrix 202 allows shielding against light from the backlight only by the light shielding metals 21 and 22.

The TFT substrate 100 is formed to be larger than the counter substrate 200, and the part of the TFT substrate 100 extended from the counter substrate 200 serves as the terminal portion 150. The outermost common wiring 11 extends to the terminal portion 150. A gate wiring extraction line, a video signal extraction line and the like (not shown) also extend to the terminal portion 150 on which an IC driver is mounted for driving the liquid crystal display panel.

The terminal portion 150 is connected to the flexible wiring substrate for supplying signals and power to the liquid crystal display panel. A connection point of the flexible wiring substrate 30 is indicated by a dotted line. The light shielding metals 21 and 22 of the adjacent liquid crystal display panel of the mother substrate are partially formed at the end part of the terminal portion 150. The aforementioned part of the light shielding metal is formed as a double-layered structure including the first light shielding metal 21 and the second light shielding metal 22. Those double-layered light shielding metals are insulated, which makes it possible to prevent short-circuit in the wirings on the flexible wiring substrates in spite of contact with the first light shielding metal 21 or the second light shielding metal 22.

In the state where the liquid display panels are separated individually as shown in FIG. 3, the first light shielding metal 21 with larger area and the second light shielding metal 22 with smaller area are in floated states. The first light shielding metal 21 and the second light shielding metal 22 are overlapped with a predetermined width via the gate insulating film 102 so as to shield against the diagonally emitted light from the backlight.

Figure 4:
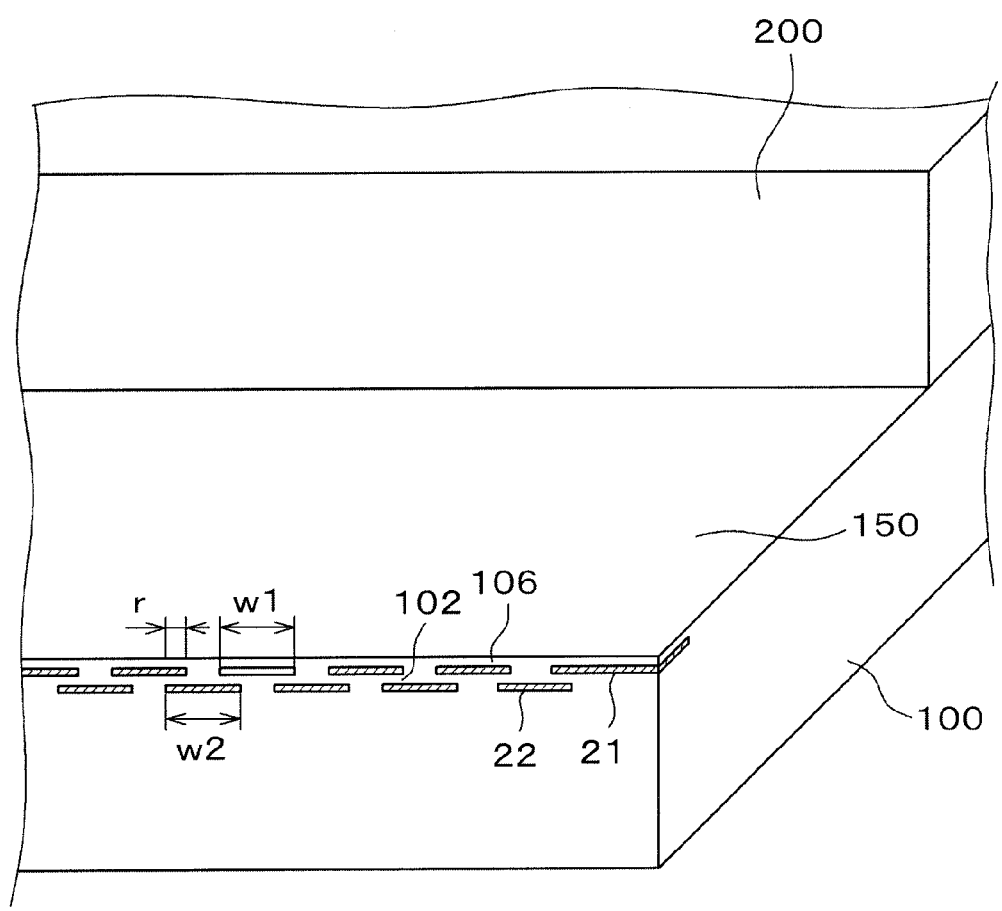
FIG. 4 is a perspective view of the liquid crystal display panel according to the present invention when seen from a terminal side.

FIG. 4 is a perspective view of the liquid crystal display panel according to the present invention. FIG. 4 shows the state before connecting the flexible wiring substrate, and the TFT substrate 100 and the counter substrate 200 are bonded via a not shown sealing material. The double-layered light shielding metal that includes the first light shielding metal 21 and the second light shielding metal 22 is formed at the end part of the terminal portion 150 of the TFT substrate 100.

Referring to FIG. 4, the first light shielding metal 21 is formed as the SD layer, and the second light shielding metal 22 is formed as the gate layer. The gate insulating film 102 is formed on the gate layer, and the passivation film 106 is formed on the SD layer. This structure prevents short-circuit in the wirings on the flexible wiring substrate caused by the contact of the wiring on the flexible wiring substrate with one of the first light shielding metal 21 and the second light shielding metal 22 resulting from connection of the end part of the terminal portion 150 with the flexible wiring substrate.

Referring to FIG. 4, the first light shielding metal has a width of w1, and the second light shielding metal has a width of w2. The first and the second light shielding metals are overlapped from a planar view with an overlapped amount of r for shielding against the diagonally emitted light from the backlight.

Figure 5:
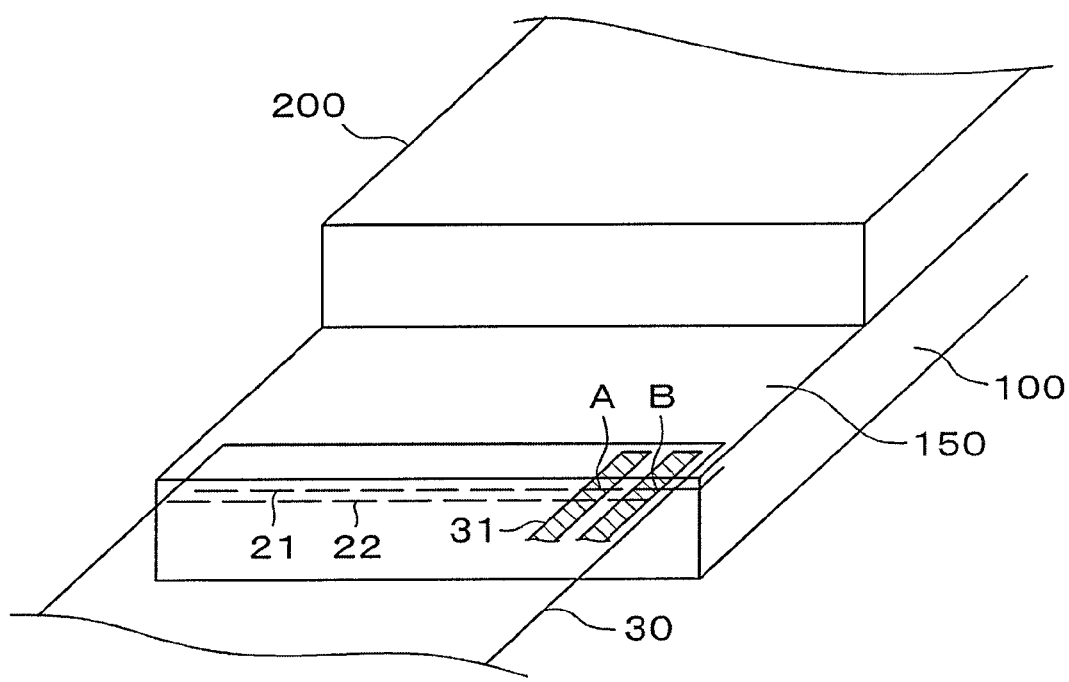
FIG. 5 is a perspective view showing a state that a flexible wiring substrate is connected to the liquid crystal display panel according to the present invention.
Figure 6:
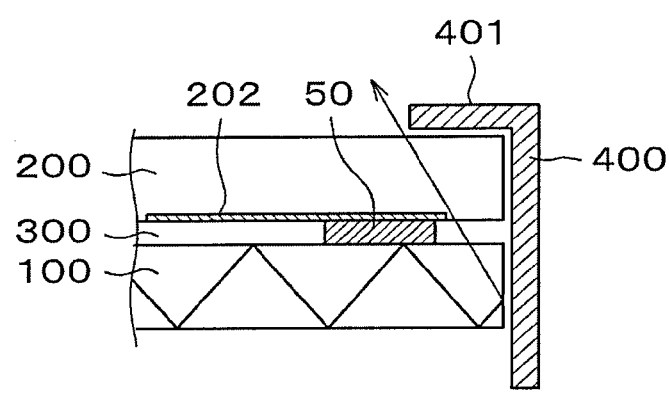
FIG. 6 is a cross sectional view showing leakage of light from a peripheral area of a generally employed liquid crystal display panel.
Figure 7:
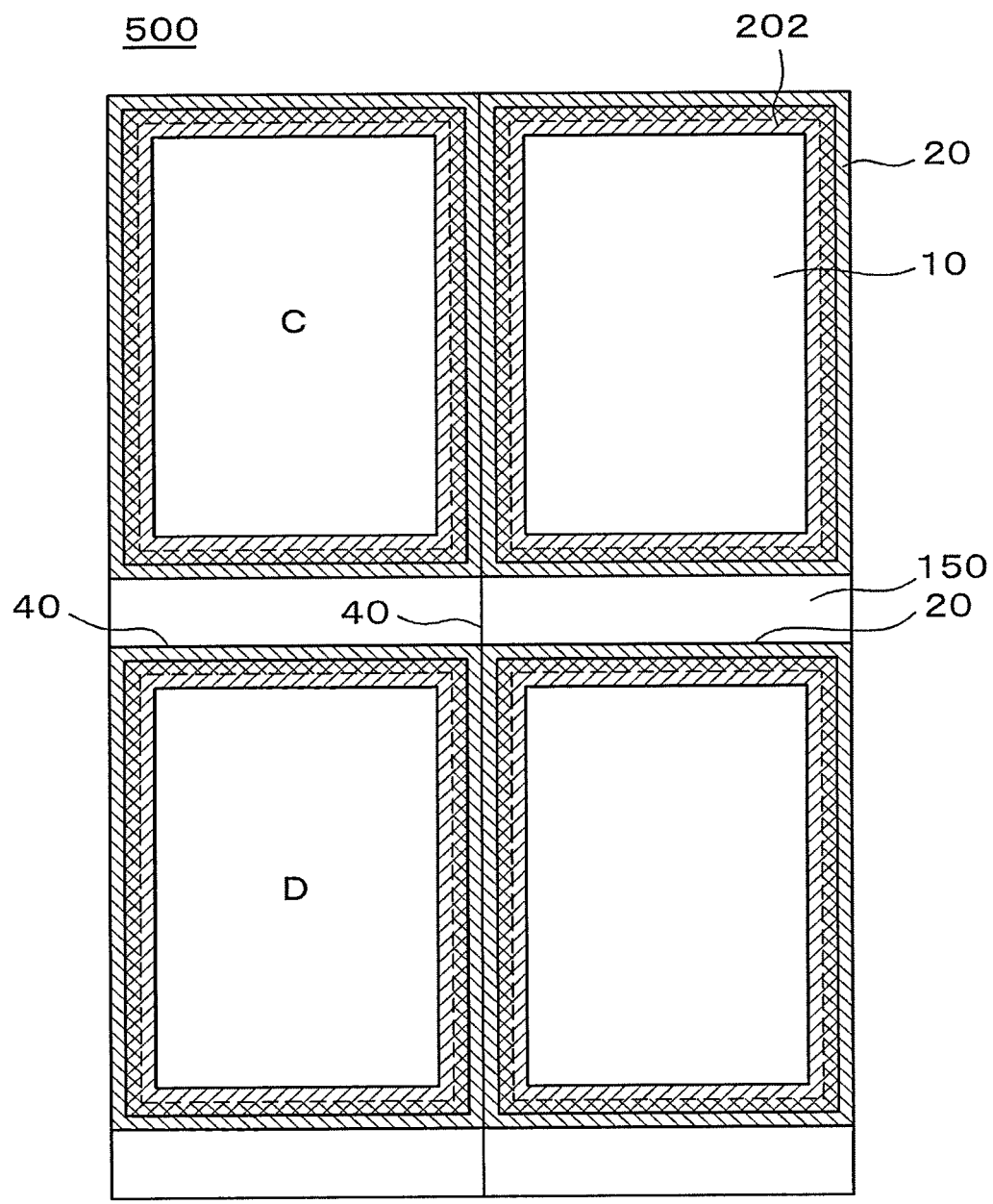
FIG. 7 illustrates a mother substrate on which the generally employed liquid crystal display panels are formed.
Figure 8:
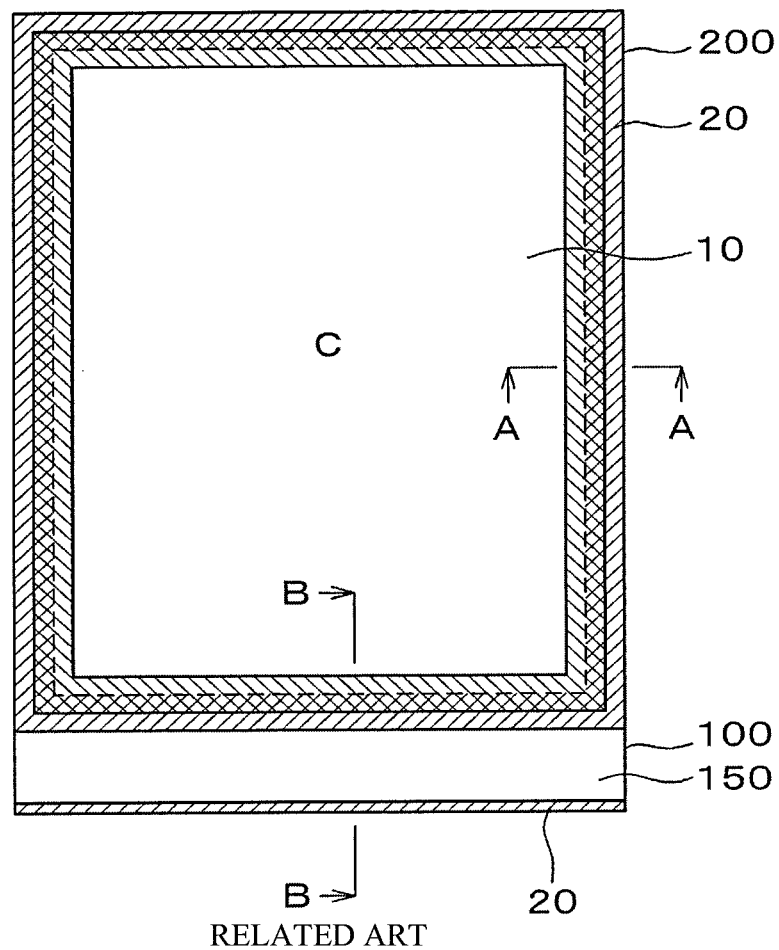
FIG. 8 is a plan view of the generally employed liquid crystal display panel.
Figure 9:
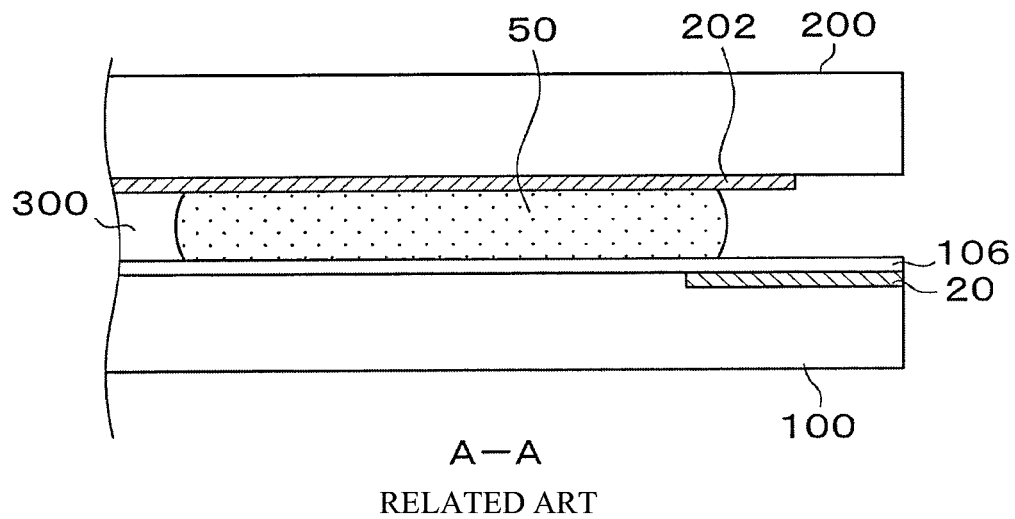
FIG. 9 is a sectional view taken along line A-A of FIG. 8.
Figure 10:
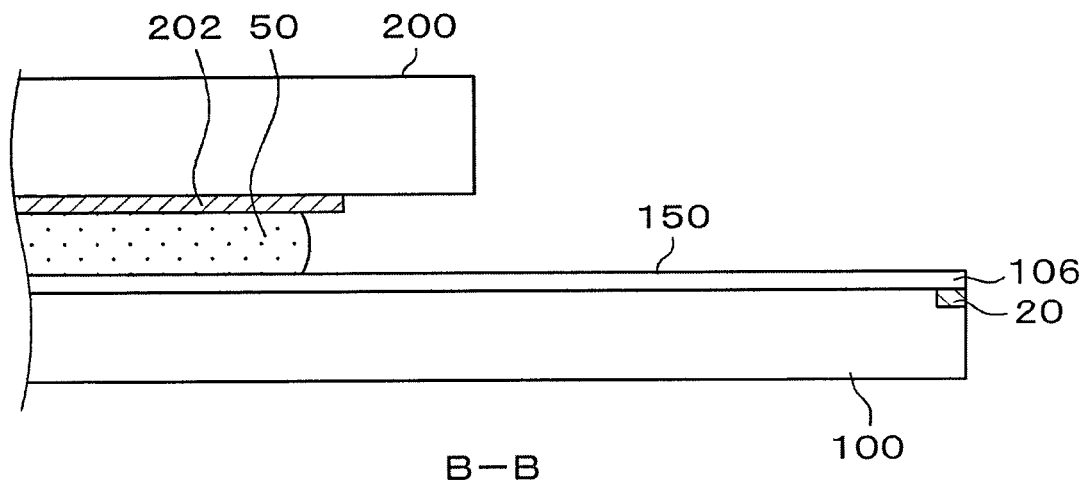
FIG. 10 is a sectional view taken along line B-B of FIG. 8.

FIG. 5 is a perspective view illustrating that the flexible wiring substrate 30 is connected to the terminal portion 150 of the liquid crystal display panel shown in FIG. 4. Referring to FIG. 5, the first light shielding metal 21 and the second light shielding metal 22 are formed as individual layers at the end part of the terminal portion 150 of the TFT substrate 100. In the case where two wirings 31 of those on the flexible wiring substrate 30 are brought into contact with the first light shielding metal 21 at points A and B, no short-circuit occurs in the two wirings 31 on the flexible wiring substrate 30 because the first light shielding metal 21 is divided.

If the second light shielding metal 22 is brought into contact with the points A and B, no short-circuit occurs in the two wirings 31 of the flexible wiring substrate 30 because the second light shielding metal 22 is also divided. Likewise, if, in FIG. 5, the point A is in contact with the first light shielding metal 21 or the second light shielding metal 22, and the point B is in contact with the second light shielding metal 22 or the first light shielding metal 21, respectively, no short-circuit occurs in the two wirings 31 of the flexible wiring substrate 30.

In the above explanation, the SD layer is used as the first light shielding metal 21, and the gate layer is used as the second light shielding metal 22. It is also possible to use the gate layer as the first light shielding metal 21 and to use the SD layer as the second light shielding metal 22.

The present invention is configured to prevent short-circuit in the wiring 31 of the flexible wiring substrate 30 at the terminal portion 150 even if the light shielding metals 21 and 22 are formed to extend to the end part of the TFT substrate 100 so as to ensure shielding against the light emitted from the backlight. Therefore, the present invention is capable of providing the liquid crystal display device with good contrast and improved connection reliability.

What is claimed is:
1. A liquid crystal display device comprising:
a TFT substrate comprising pixels arranged in a matrix, the pixels each having a TFT and a pixel electrode;
a counter substrate bonded with the TFT substrate by a sealing material; and
a liquid crystal within a space defined by the TFT substrate and the counter substrate,
wherein
a part of the TFT substrate extends from the counter substrate, a first portion of the part of the TFT substrate extending from the counter substrate is configured as a terminal portion, a second portion of the part of the TFT substrate different from the terminal portion has first light shielding metals extending to an end part of the TFT substrate, the first light shielding metals, each having a first width, are arranged at an outermost end side of the terminal portion at a first predetermined pitch, second light shielding metals, each having a second width, are arranged below the first light shielding metals at a second predetermined pitch at the outermost end side of the terminal portion, the second light shielding metals are separated from the first light shielding metals by an insulating film, and the first light shielding metals and the second light shielding metals partially overlap in a planar view.

2. The liquid crystal display device according to claim 1, wherein the first width of the first light shielding metals is equal to the second width of the second light shielding metals.

3. The liquid crystal display device according to claim 1, wherein the first light shielding metals are formed as a layer that is the same as a source/drain layer formed on the TFT substrate, and the second light shielding metals are formed as a layer that is the same as a gate layer.

4. The liquid crystal display device according to claim 1, wherein the first light shielding metals are formed in a layer that is the same as a gate layer formed on the TFT substrate, and the second light shielding metals are formed in a layer that is the same as a source/drain layer.

5. The liquid crystal display device according to claim 1, wherein the first predetermined pitch is equal to the second predetermined pitch.

6. A method of manufacturing a liquid crystal display device, the method comprising:

forming a mother substrate comprising a plurality of liquid crystal display panels, the mother substrate being formed by forming a TFT substrate and bonding the TFT substrate with a counter substrate using a sealing material; and separating each of the plurality of liquid crystal display panels from the mother substrate along cutting lines, wherein the TFT substrate comprises pixels arranged in a matrix, each of the pixels is formed having a TFT and a pixel electrode, and forming the TFT substrate comprises:

forming first light shielding metals at a first predetermined pitch along a boundary between a first liquid crystal display panel of the plurality of liquid crystal display panels and a second liquid crystal display panel of the plurality of liquid crystal display panels, the first light shielding metals being formed having a first width;

forming an insulating layer over the first light shielding metals; and forming second light shielding metals at a second predetermined pitch along the boundary between the first liquid crystal display panel of the plurality of liquid crystal display panels and the second liquid crystal display panel of the plurality of liquid crystal display panels, the second light shielding metals being formed having a second width, and wherein the cutting lines are along a region in which the first light shielding metals and the second light shielding metals are formed.

7. The method of manufacturing a liquid crystal display device according to claim 6, wherein the first light shielding metals are electrically coupled with one another before separating each of the plurality of liquid crystal display panels from the mother substrate along the cutting lines.

8. The method of manufacturing a liquid crystal display device according to claim 6, wherein the first predetermined pitch is equal to the second predetermined pitch.

9. The method of manufacturing a liquid crystal display device according to claim 6, wherein the first width is equal to the second width.

10. A method of manufacturing a liquid crystal display device, the method comprising:

forming a mother substrate comprising a plurality of liquid crystal display panels, the mother substrate being formed by bonding a TFT substrate with a counter substrate using a sealing material, wherein the TFT substrate comprises:

pixels arranged in a matrix, the pixels each having a TFT and a pixel electrode;

first light shielding metals having a first width, the first light shielding metals being positioned at a first predetermined pitch along a boundary between a first liquid crystal display panel of the plurality of liquid crystal display panels and a second liquid crystal display panel of the plurality of liquid crystal display panels;

an insulating layer over the first light shielding metals; and second light shielding metals having a second width, the second light shielding metals being positioned at a second predetermined pitch along the boundary between the first liquid crystal display panel of the plurality of liquid crystal display panels and the second liquid crystal display panel of the plurality of liquid crystal display panels; and separating each of the plurality of liquid crystal display panels from the mother substrate along cutting lines, the cutting lines being along a region in which the first light shielding metals and the second light shielding metals are positioned.

11. The method of manufacturing a liquid crystal display device according to claim 10, wherein the first predetermined pitch is equal to the second predetermined pitch.

12. The method of manufacturing a liquid crystal display device according to claim 10, wherein the first width is equal to the second width.

* * * * *